United States Patent [19]
Vranish

[11] Patent Number: 5,868,226
[45] Date of Patent: Feb. 9, 1999

[54] SCREW-RELEASED ROLLER BRAKE

[75] Inventor: John M. Vranish, Crofton, Md.

[73] Assignee: The United States of America as represented by the Administrator of the National Aeronautics and Space Administration, Washington, D.C.

[21] Appl. No.: 598,298

[22] Filed: Feb. 8, 1996

[51] Int. Cl.[6] ................................................. F16D 41/07
[52] U.S. Cl. ........................ 188/82.8; 188/82.1; 192/45.1
[58] Field of Search ................................. 188/82.8, 82.1, 188/82.84, 61, 82.2, 82.3; 192/45.1

[56] References Cited

U.S. PATENT DOCUMENTS

| 3,443,672 | 5/1969 | Giesa | 188/82.8 |
| 3,712,431 | 1/1973 | Versoy | 188/82.8 |
| 5,079,460 | 1/1992 | Vranish . | |
| 5,103,941 | 4/1992 | Vranish . | |
| 5,275,261 | 1/1994 | Vranish . | |
| 5,482,144 | 1/1996 | Vranish | 192/45.1 |
| 5,601,167 | 2/1997 | Kihoshita et al. | 188/82.8 |

Primary Examiner—Douglas C. Butler
Attorney, Agent, or Firm—Keith L. Dixon

[57] ABSTRACT

A screw-released roller brake including an input drive assembly, an output drive assembly, a plurality of locking sprags, a mechanical tripper nut for unlocking the sprags, and a casing therefor. The sprags consist of three dimensional (3-D) sprag members having pairs of contact surface regions which engage respective pairs of contact surface regions included in angular grooves or slots formed in the casing and the output drive assembly. The sprags operate to lock the output drive assembly to the casing to prevent rotation thereof in an idle mode of operation. In a drive mode of operation, the tripper is either self actuated or motor driven and is translated linearly up and down against a spline and at the limit of its travel rotates the sprags which unlock while coupling the input drive assembly to the output drive assembly so as to impart a turning motion thereto in either a clockwise or counterclockwise direction.

21 Claims, 12 Drawing Sheets

SCREW-RELEASED ROLLER BRAKE

ORIGIN OF THE INVENTION

This invention was made by an employee of the United States Government and may be used by or for the Government for governmental purposes without the payment of any royalties thereon or therefor.

CROSS-REFERENCE TO RELATED APPLICATION

This patent application is related to application Ser. No. 08/280,979 entitled, "3-D Roller Locking Sprags", filed in the name of John M. Vranish, the subject inventor, on Jul. 27, 1994, now U.S. Pat. No. 5,482,164 and is intended to be incorporated herein by reference. This related application is also assigned to the assignee of the subject application.

BACKGROUND OF THE INVENTION

1. Field of the Invention

This invention relates generally to mechanical brake/clutch devices and more particularly to sprag type locking devices which operate between a drive member and a reaction member.

2. Description of the Prior Art

Over-running one-way roller and ball locking techniques are well known and have been used extensively for many years. Moreover, roller-locking sprags in one form or another are also well known. Such devices wedge between rotation members with great force when the brake is undergoing large loads which is in the form of torques. To release such a device when it acts as a brake under load, the sprags must be pried loose. This has been a prevalent and general limitation in all types of roller locking devices.

A typical roller locking brake mechanism is shown and described in U.S. Pat. No. 5,103,941 entitled, "Roller Locking Brake" which issued to John M. Vranish, the present inventor, on Apr. 14, 1992. There a roller locking brake structure includes a roller locking/lifting ring, a housing, a set of conical locking rollers, a striker ring and a drive disc. The roller locking/lifting ring includes respective V-shaped locking cam surface segments for each locking roller which is in the form of a truncated cone and provides a force and torque reaction surface for forces and torques generated in the braking process.

An electromagnetic brake and clutch mechanism using roller locking devices is also shown and described in U.S. Pat. No. 5,275,261 entitled, "Electromagnetic Brake/Clutch Device" issued to John M. Vranish on Jan. 4, 1994. There a dedicated magnetic solenoid unlocks a plurality of cammed rollers which prevent rotation of a drive shaft. Such a structure, however, has inherent limitations. For example, the solenoid has a limited stroke and the tolerances on the stroke are frequently critical. Also, the strength of the solenoid is typically weak near the beginning of its stroke where the strength is most needed. Furthermore, magnetic windings and the core associated with the solenoid are typically heavy and occupy valuable space. Also the solenoids typically require considerable current spike which complicates the electronic circuitry associated therewith.

More recently, a three-dimensional (3-D) roller locking sprag has been developed. Such a structure is shown and disclosed in the above cross-referenced application, U.S. Ser. No. 08/280,979 (GSC 13,617) and provides an improvement in sprag type devices which effectively doubles the sprag locking angle without increasing contact stresses associated with the sprags.

SUMMARY

Accordingly, it is a primary objective of the present invention to provide an improvement in roller type braking devices.

It is another object of the present invention to provide an improvement in sprag type braking devices.

It is a further object of the present invention to provide an improvement in three-dimensional sprag type braking devices.

It is still another object of the present invention to provide an improvement in both self-actuated and motor driven unlocking assemblies using sprag type braking devices.

Briefly, the foregoing and other objects are achieved by an input drive assembly, an output drive assembly, a plurality of locking sprags, a mechanical tripper nut for unlocking the sprags, and a casing therefor. The sprags comprise three dimensional (3-D) sprag members having pairs of contact surface regions which engage respective pairs of contact surface regions included in angular grooves or slots formed in the casing and the output drive assembly. The sprags operate to lock the output drive assembly to the casing to prevent rotation thereof in an idle mode of operation. In a drive mode of operation, the tripper is either self actuated or motor driven and is translated linearly up and down against a spline and at the limit of its travel rotates the sprags which unlock while coupling the input drive assembly to the output drive assembly so as to impart a turning motion thereto in either a clockwise or counterclockwise direction.

BRIEF DESCRIPTION OF THE DRAWINGS

The following detailed description of the invention will be more readily understood when considered together with the accompanying drawings in which.

DETAILED DESCRIPTION OF THE PREFERRED EMBODIMENTS

This invention is particularly adapted to form part of an electromechanical rotary actuator system or rotary joint, a device well known, for example, in the art of robotics. Such a system typically includes, inter alia, an electric motor, a torque multiplying transmission and a brake/clutch. The subject invention performs the function of a brake/clutch in such a rotary joint.

The invention which will now be described is directed to a screw-release roller brake mechanism which can be actuated in one of two ways. In one preferred embodiment, it is self actuated, i.e. the rotary joint both operates the brake and releases or locks it as the case may be, and drives the load acting on the output of the joint. In another preferred embodiment, a dedicated motor releases and locks the brake and the remainder of the rotary joint is only required to drive the load.

Figure 1A:
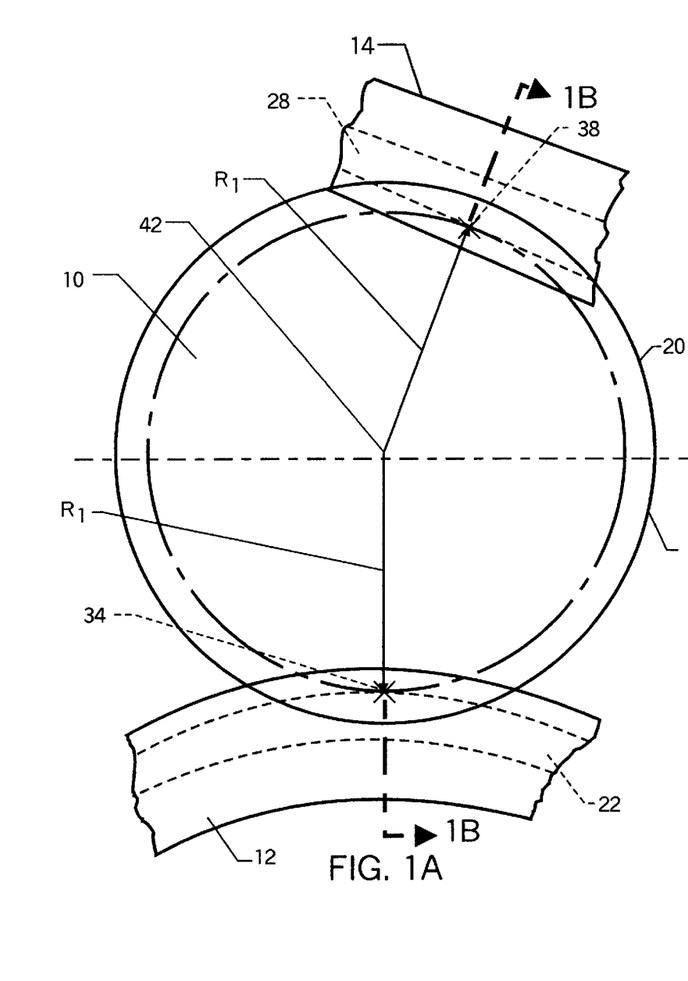
FIG. 1A is a side elevational view of a known prior art three dimensional (3-D) sprag device.
Figure 1B:
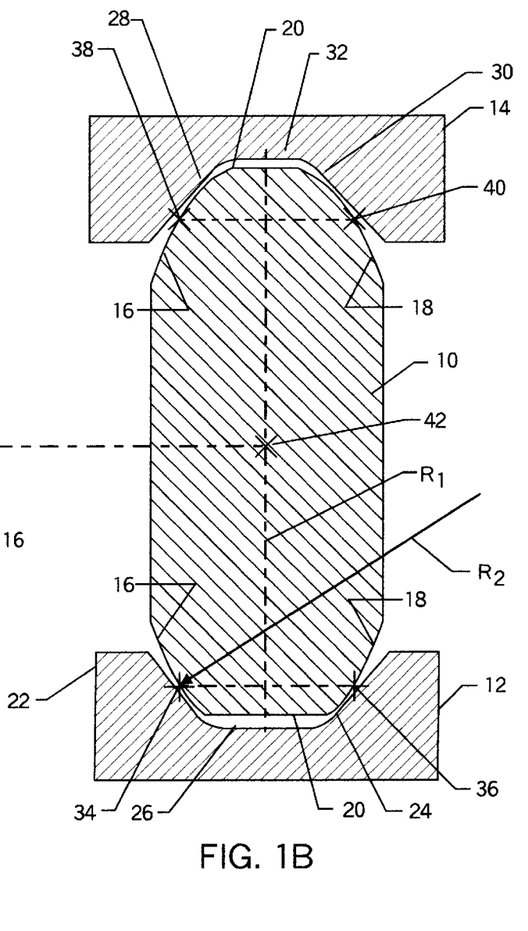
FIG. 1B is a cross sectional view of the sprag device shown in FIG. 1A taken along the lines 1B—1B thereof.

Prior to considering the embodiments of the invention, reference will first be made to FIGS. 1A and 1B which illustrate the mechanics of a three dimensional (3-D) sprag such as shown and described in the above related patent application, U.S. Ser. No. 08/280,979 (GSC 13,617) and which is incorporated herein by reference. As shown in FIGS. 1A and 1B, a sprag member 10 is located between a driver member 12 and a reaction member 14. The sprag member 10 includes a pair of symmetrical curved outer side surfaces 16 and 18 inward of a flat peripheral rim surface 20 which contact a pair of mutually diverging side wall surfaces 22 and 24 of a groove or slot 26 formed in the driver member 12 and a pair of mutually diverging side wall surfaces 28 and 30 in a groove or slot 32 formed in the reaction member 14. The side wall surfaces 16 and 18 contact the side wall surfaces 22 and 24 of the driver in the regions identified by reference numerals 34 and 36, while the side surfaces 16 and 18 contact the diverging side wall surfaces 28 and 30 of the reaction member in the regions shown by reference numerals 38 and 40.

Further as shown in FIG. 1B, both pairs of side wall surfaces 22, 24 and 28, 30 of the driver member 12 and the reaction member 14, respectively, are of the same type, i.e. flat surfaces, which respectively contact curved, i.e. convex wall surfaces 16 and 18 of the sprag member 10. It should be noted that the radius of curvature $R_2$ of the surfaces 16 and 18 is large relative to the radius $R_1$ which extends from the sprag rotational axis 42 outward to the contact surface regions 34, 36 and 38, 40. This permits the sprag member 10 to roll in the grooves 26 and 32 of the driver and reaction members 12 and 14 via pairs of symmetrically located opposing contact surfaces. Such a structure is capable of effectively doubling the locking effectiveness of the sprag member 10 against the reaction member 14 without increasing the contact stresses on the sprag member 10. It should be noted that various combinations of flat, convex and concave wall surfaces can be utilized, depending upon the specific design.

This now leads to consideration of the preferred embodiments of this invention.

Figure 2A:
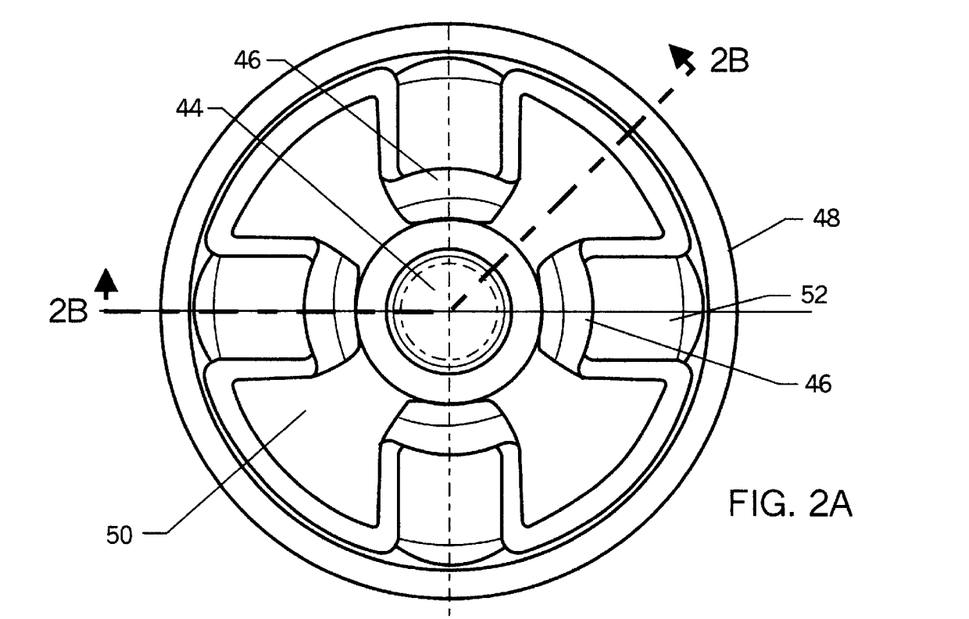
FIG. 2A is a top plan view of a first embodiment of the invention.
Figure 2B:
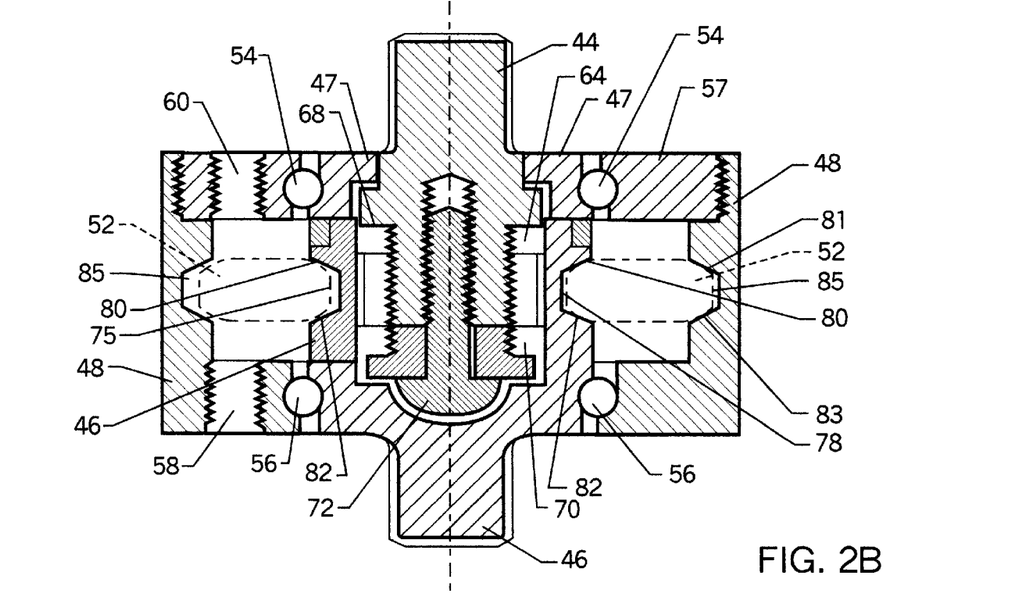
FIG. 2B is a cross sectional view of the first embodiment shown in FIG. 2A taken along the lines 2B—2B thereof.

Referring now to the remaining figures where like reference numerals refer to like parts, FIGS. 2A and 2B are illustrative of a self-actuated screw released roller brake for a rotary drive member 44 which is adapted to be coupled to and drive a rotary output drive member 46 which includes a retaining ring 47. Associated with these elements are a generally cylindrical casing 48, a tripper nut member 50, and a plurality of three dimensional (3-D) sprags 52 shown in a phantom view but which are shown in detail in FIGS. 7, 8A–8C and will be considered subsequently.

The output drive member 46 and its retaining ring 47, moreover, rotate within the casing 48 by means of two sets of upper and lower ball bearings 54 and 56. The housing 48 is complemented by an upper assembly ring member 57 which is threaded to engage the upper portion of the housing 48 and is adapted to contact the ball bearings 54 on its inner surface. Further as shown in FIG. 2B, a pair of mounting holes 58 and 60 are included in the casing 48 and assembly ring 57.

Figures 3, 4A, 4B:
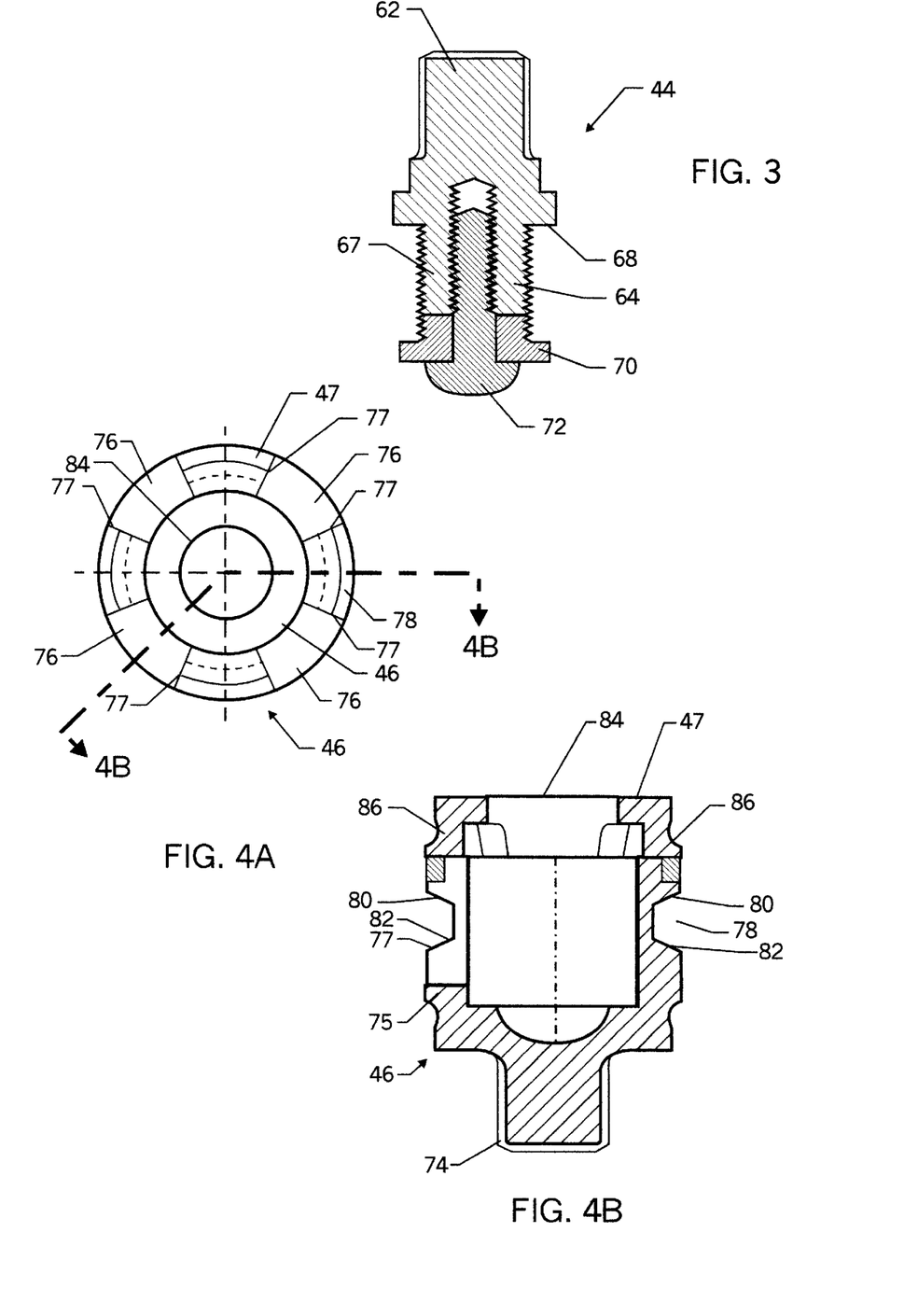
FIG. 3 is a longitudinal cross sectional view further illustrating the input drive assembly shown in FIG. 2B.
FIG. 4A is a top plan view of the output drive assembly shown in FIG. 2B.
FIG. 4B is a sectional view of the output drive assembly shown in FIG. 4A taken along the lines 4B—4B.
Figure 5:
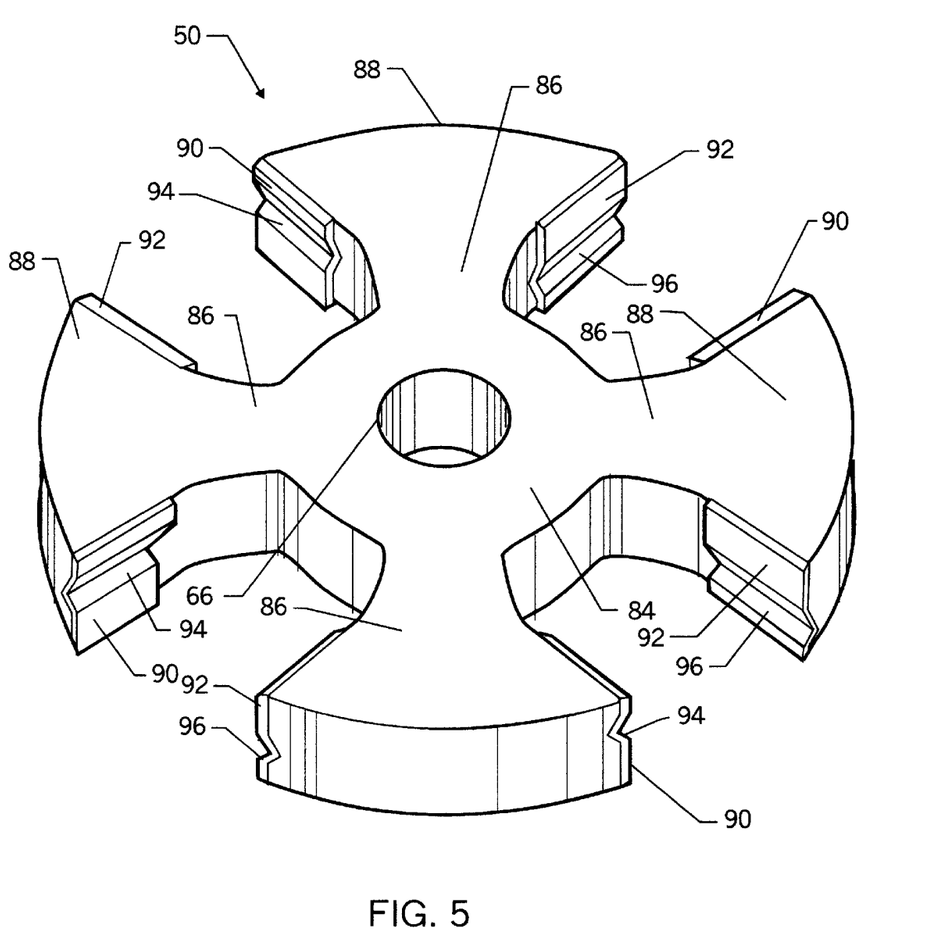
FIG. 5, is a perspective view further illustrative of the tripper member shown in FIG. 2B.

Considering now the structural details of these parts, the input drive member 44 is shown in FIG. 3 comprised of a stem 62 which is adapted to be coupled to an electric drive motor or robotic wrist joint, not shown. The inner end portion 64 of the input drive member 44 is threaded for engagement with a threaded bore 66 of the tripper nut member 50 (FIG. 5). At the upper end of the threaded section 64, there is a shoulder stop 68. A lower shoulder stop is formed by a flat faced plug 70 fitted into the distal end of the threaded section and held in position thereat by a screw or bolt 72.

Insofar as the details of the output drive member 46 is concerned, it is further shown in FIGS. 4A and 4B and includes a stem 74 for engaging an output device, not shown. The stem 74 broadens into an upper body portion 75 which includes four spline slots 76 and associated flat contact surfaces 77 and a circumferential groove 78 including a pair of mutually inclined side walls 80 and 82 for contacting a plurality of sprag members 52.

The upper retaining ring 47 includes an inner wall surface configuration 84 for mating with the stem portion 62 of the drive member 44 while providing the required clearances therebetween. The outer shoulder 86 is configured to provide a race for the upper set of ball bearings 54.

Figure 6A:
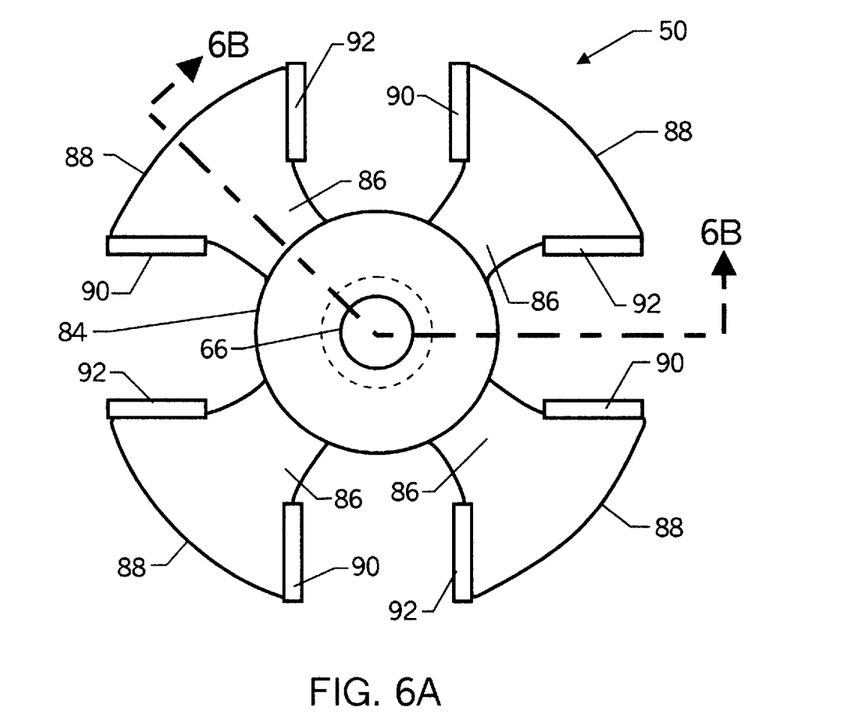
FIG. 6A is a top plan view of the tripper member shown in FIG. 5.
Figure 6B:
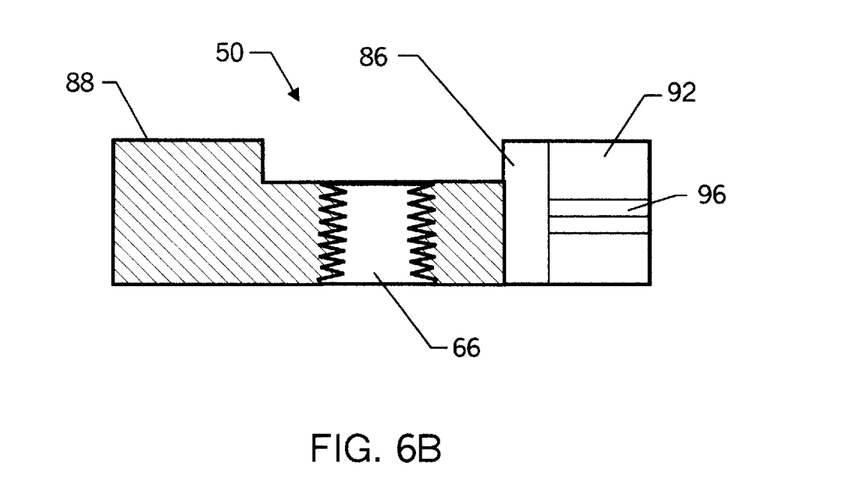
FIG. 6B is a sectional view of the tripper member shown in FIG. 6A taken along the lines of 6B—6B thereof.

Referring now to FIGS. 5 and 6A–6B, shown thereat are the details of the tripper nut member 50 which is used for unlocking a set of sprags 52, for example, shown in phantom in FIG. 2B. The tripper nut 50, as best depicted in FIG. 5, is comprised of an inner ring portion 84 from which four arm portions or spokes 86 extend and terminate in curvilinear outer rim portions 88 which respectively include front and rear faces 90 and 92. Each of the faces 90 and 92 respectively include upper and lower recessed tripper surfaces 94 and 96 as shown.

Figure 7:
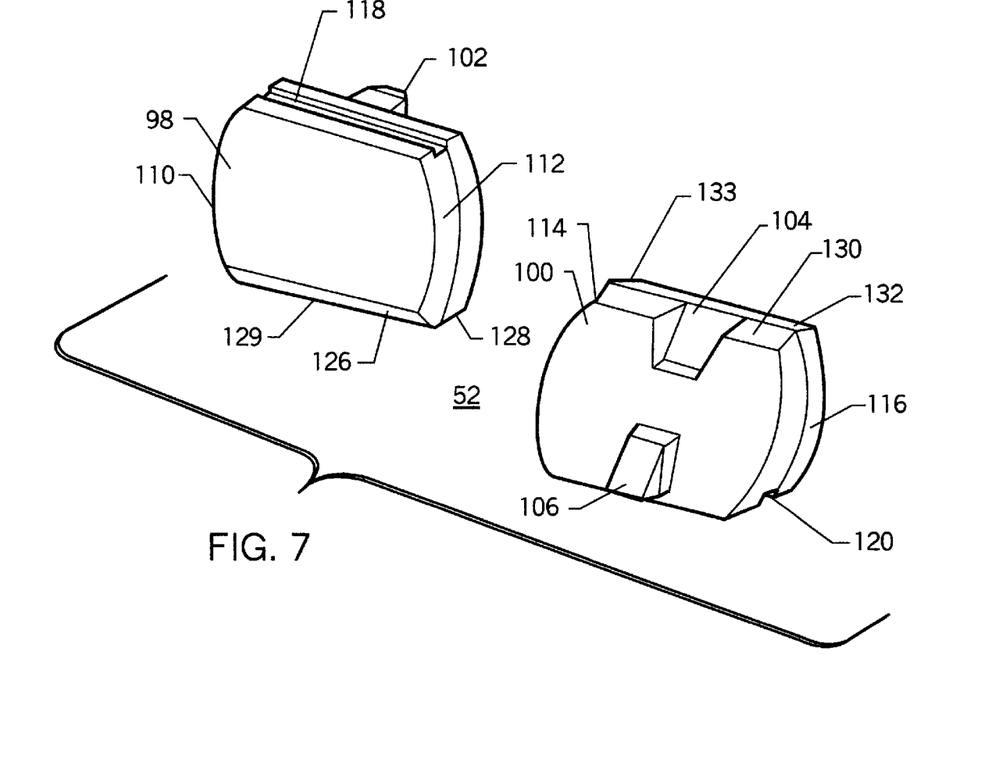
FIG. 7 is a perspective view of the left and right half portions of a 3-D sprag member utilized in the embodiment shown in FIGS. 2A and 2B.
Figure 8A:
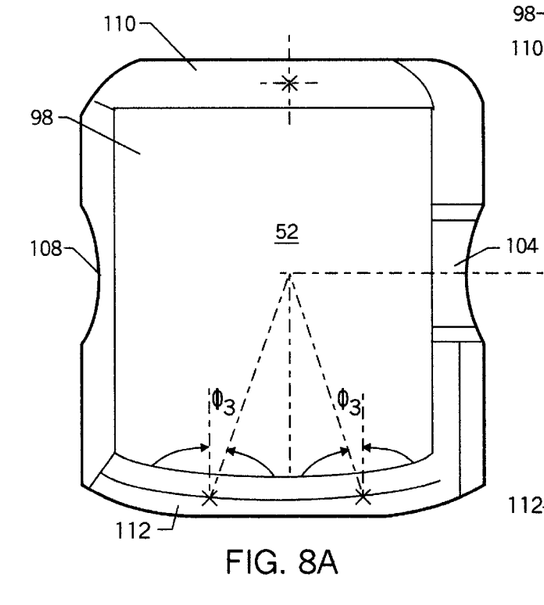
FIG. 8A is a top plan view of the 3-D sprag member shown in FIG. 7.
Figure 8B:
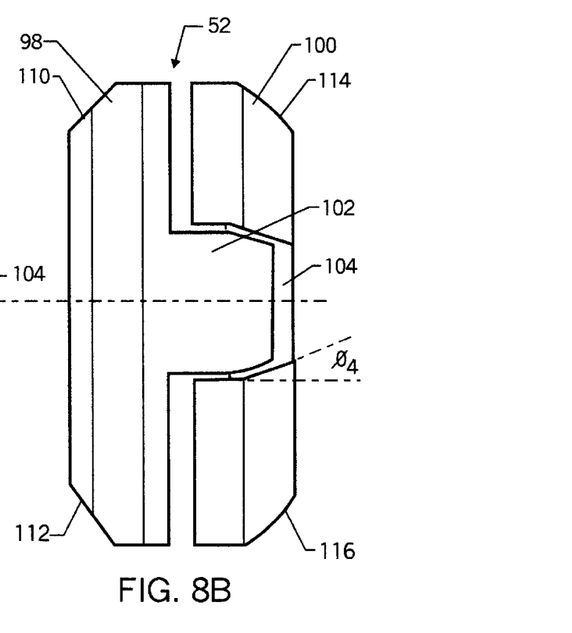
FIG. 8B is a partially exploded side plan view of the 3-D sprag member shown in FIG. 8A.
Figure 8C:
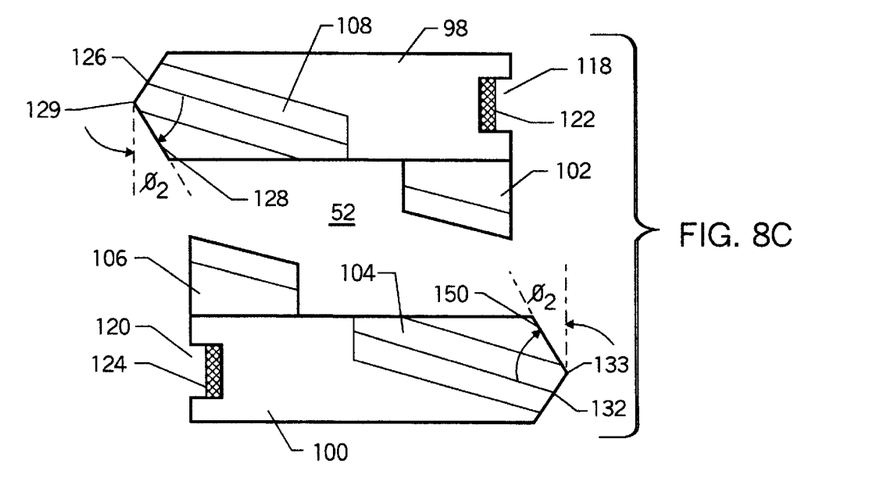
FIG. 8C is an exploded side plan view of the left and right half portions of the 3-D sprag member shown in FIG. 7.

With respect to the sprags 52 shown utilized in conjunction with the first embodiment of the invention, the details of the sprags 52 are shown in FIG. 7 and FIGS. 8A–8C. Each sprag 52 comprises a split 3-D sprag device consisting of two complementary half sections, an upper half section 98 and a lower half section 100 which pancake together as shown in FIG. 8B. The half sections 98 and 100, moreover, are designed to mutually slide toward and away from one another under a spring bias by way of complementary tongue and groove sections. For example, the upper half section 98 includes an angulated tongue section 102 which fits in a complementary groove 104 of the lower section 100. In a like manner, the lower sprag half section 100 includes a tongue section 106 which is adapted to engage the groove 108 in the upper sprag half section 98 as shown in FIG. 8C. The upper sprag half section 98 further includes upper and lower convex sprag contact surfaces 110 and 112 which depend from a rim surface 112, while the lower sprag half section 100 likewise includes a like pair of convex sprag contact 114 and 116. The sprag sections 98 and 100 also include a preload spring groove 118 and 120 for a pair of preload springs 122 and 124 which tend to bias both sprag half sections 98 and 100 mutually outward against the inclined side walls 80 and 82 of the groove 78 in the output drive member 46 as well as the inclined side walls 81 and 83 of the sprag groove 85 in the casing 48 as shown in FIG. 2B.

Further, as shown in FIG. 8C, a pair of angulated surfaces 126 and 128 are located on the outside edge 129 of the upper half section 98 for being contacted by the upper tripper surfaces 94 (FIG. 5) of the tripper 50 while a like pair of angulated surfaces 130 and 132 are located on the inside edge 133 of the lower half section for being contacted by the lower tripper surfaces 96.

The 3-D sprag members 98 and 100 shown in FIGS. 8A–8C are designed with the following typical angle values: $\theta_1=15°$, $\theta_2=30°$, $\theta_3=20°$ and $\theta_4=20°$.

Considering now the operation of the first embodiment of the invention, as best shown in FIG. 2B, the sprags 52 are normally locked, that is the load on the output drive member 46 couples through the locking sprags 52 to the casing 48. Under this condition, there is a deliberate clearance between the tripper nut member 50 and the locking sprags 52. To release the sprags 52, for example, against a counterclockwise torque, a clockwise torque is applied to the input drive member 44. The threaded shank portion 64 (FIG. 3) of the drive member 44 turns with this torque and in doing so, turns the tripper nut member 50. However, the tripper 50 turns only slightly because it encounters the splined slot 76 (FIG. 4B) in the output drive member 46 which results in the tripper nut 50 translating upward due to the thread contact made with the threads 66 inside of the tripper ring portion 84 and the threads 67 on shank portion 64 of the input drive member 44. In the process of translating upwards, the tripping nut member 50 encounters the angulated surfaces 126 and 128 of the upper sprag half 98 (FIG. 7). The tripper nut 50 continues to move upwards with great force, pushing the upper half portion 98 of the sprags 52 to the left, which acts to foreshorten the locking sprags in a dimension which causes them to release. At the same time, the surfaces 130 and 132 of the lower sprag half 100 are encountered on the other side which pushes the member 100 to the left so the sprag halves 98 and 100 move toward each other causing them to foreshorten.

This accomplished, the tripper nut 50 continues its upward travel until it encounters the upper shoulder stop 68 of the input drive member 44. At this point, the tripper nut 50 serves to couple the input drive member 44 directly to the output drive member 46, causing the output drive member 46 to rotate clockwise in unison with the input drive member 44. The locking sprags 52 are trapped in the tripper arms 86 and rotate with the input drive member 44. If the input drive member 44 is caused to rotate counterclockwise slowly enough so that the load on the output drive member 46 is sufficient to maintain the tripper member 42 positioned against the top stop 68 of the input drive member 44 the output drive member 46 will follow.

To relock the system, however, it is only necessary to rotate the input drive member 44 counterclockwise faster than the inertia of the load coupled to the output drive member 46, thus causing the tripper 50 to translate downward from the upper shoulder stop 68 and restore the gap between the tripper faces 90 and the tripping surfaces 126, 128 and 130, 132 of the locking sprags 52. When this occurs, the preload springs 122 and 124 will restore the outward force to the top and lower halves 98 and 100 of the sprag 52, causing the brake to lock.

To release the sprags 52 under a clockwise load, the process described above need only be reversed, with the input drive member 44 being rotated counterclockwise. The tripper member nut 50 will then translate downward, releasing the lower half portion 100 of the sprags 52 and come to a stop against the bottom shoulder stop 70 (FIG. 3), again coupling the input and output drive members 44 and 46 together and rotate in unison in a clockwise direction.

In the embodiment described above, the locking sprags 52 adjust their outwardly biased dimension so that they can lock in both clockwise and counterclockwise directions, and thus are particularly useful where great load capabilities are required in very compact packages.

Figure 9A:
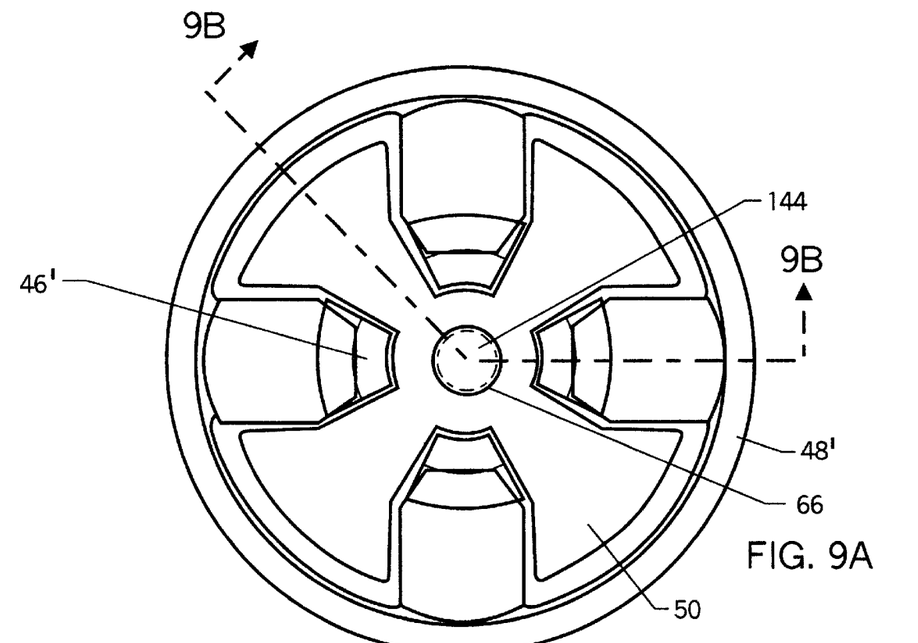
FIG. 9A is a top plan view of a second embodiment of the invention.
Figure 9B:
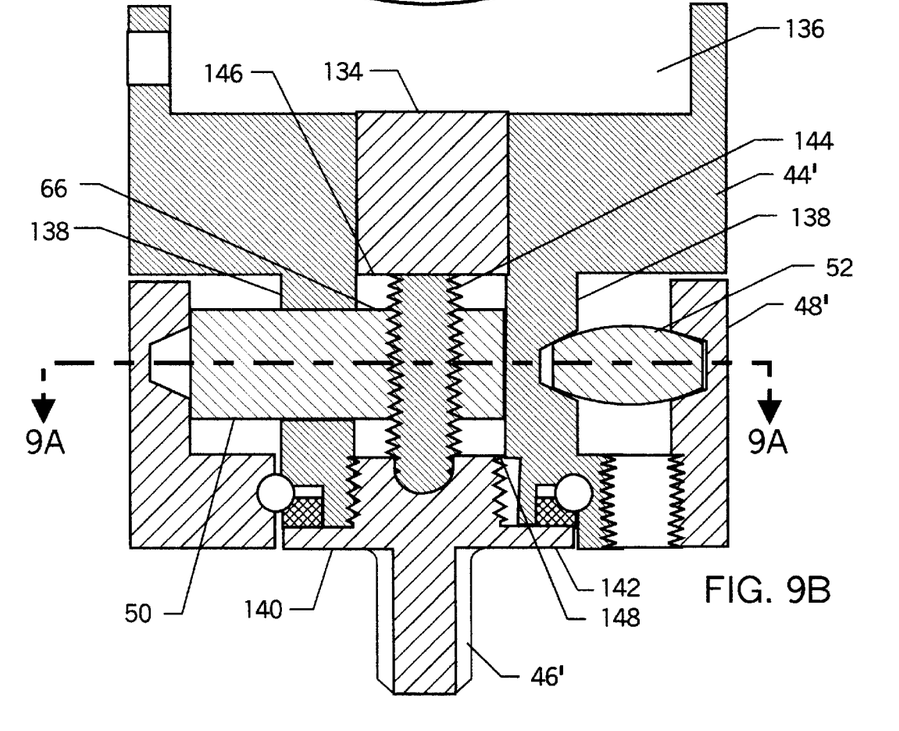
FIG. 9B is a sectional view of the second embodiment shown in FIG. 9A taken along the lines 9B—9B thereof.

Considering now a second embodiment of the invention, reference is now made to FIGS. 9A and 9B where there is shown a motor-actuated brake release mechanism according to the subject invention. This embodiment is similar in most respects to the first embodiment shown in FIGS. 2A and 2B, with the exception that the input drive member 44 of FIGS. 2B and 3 is replaced by a modified input drive member 44' which includes a dedicated tripper motor 134. When desirable, the drive motor 134 and drive member 44' can be integrated into a single unit. The input drive member 44', moreover, includes a cavity 136 for the attachment of a torque motor or robotic joint thereto, not shown. Further, the input drive member 44' is shown including a plurality of depending torque tabs 138 which replace the spline surfaces 76 of the output drive member 46 shown in FIG. 4B. In this embodiment, an output drive member 46' is directly connected to the torque tab 138 by a set of threads 140 on the inner end thereof and is secured thereto by means of a roll pin 142. In the embodiment shown in FIG. 9B, the unlocking/locking motor 134 includes a threaded output shaft 144 which engages the threads 66 of a tripper nut 50 (FIG. 5).

In operation, when a rotary joint, not shown, coupled to the input drive member 44' turns, the tripping motor 134 and the input and output drive members 44' and 46' turn as well. When the sprags 52 are locked and the input assembly 44' is not exerting torque, the load path goes from the output drive member 46' through the locking sprags 52 to the casing 48'. When, however, the tripper motor 134 is activated, the threaded shaft 144 causes the tripper nut 50 to travel upward and perform a tripping and unlocking function in the same way as before. However, there are two important differences. First, the tripper nut member 50 can be made smaller in diameter than that of the self-actuated device described heretofore because it does not need to withstand the load torque. This permits the tripper nut member 50 to have a very large mechanical advantage and permits the use of a very small, compact motor 134 to perform the tripping function. Secondly, the tripping action can be performed the same way for either clockwise or counterclockwise loads, with the tripper member traveling between the upper and lower stops 146 and 148 provided by the inner extremities of the motor 134 and the output drive member 46'.

The self-actuated and motor-actuated embodiments of the invention considered above were based on two-way, 3-D locking sprags 52. Now what will be considered are third and fourth embodiments of the invention which use a opposing one-way, 3-D locking sprags as shown by reference numerals 156 and 158 in FIGS. 10A and 12A.

Referring now to the third embodiment which is directed to a self-actuated, one-way locking sprag configuration, reference will now be made to FIGS. 10A and 10B. As shown in FIG. 10B, a modified input drive member 44" and a modified output drive member 46" are located in a modified casing 48". The input drive member 44' now integrates the components associated therewith in FIG. 2B to include both upper and lower shoulder stops 68 and 70. The output drive member 46" is now split into upper and lower half portions 150 and 152 for ease of manufacture and are fastened together. However, the upper and lower sets of ball bearings 54 and 56 are repositioned as shown. A lower assembly disc 154 is now located on the bottom of the structure adjacent the member 152 of the output drive assembly 46". The upper half portion 150 of the output drive member 46" is configured to additionally include a plurality of splined surface regions shown by reference numeral 156 to engage a tripper nut member 50 such as shown in FIG. 5.

Considering now the sprag members of the third embodiment, they comprise two complementary sets of one-way sprag members $156_1$, $156_2$, $156_3$ and $158_1$, $158_2$, $158_3$, are pivotally mounted on the upper output drive member 150 by means of respective pins 160. The details of one of these sprag members, for example sprag member 156, is shown in FIG. 11. As shown, it consists of a single irregularly shaped body member 162 having a centralized pivot hole 164 for receiving a pin 160 therethrough as shown in FIGS. 10A and 10B. The outer peripheral surface 166 of the body portion 162 is flat as shown in FIG. 10A and from which a pair of chamfered sprag locking surfaces 168 and 170 extend therefrom. A pair of lower chamfered sprag locking surfaces 172 and 174 are formed on the other side of the pivot hole 160 at the lower portion of the sprag body 162. A tail portion 176 includes an angulated side face 178 opposite a flat side face 177 for being actuated by the tripper 50. Thus, for example, a clockwise rotation of the tripper nut member 50 will unlock the sprags $156_1$, $156_2$ and $156_3$ when it rotates in a clockwise direction. For a counterclockwise direction, the tripper will unlock the sprags $158_1$, $158_2$ and $158_3$. Each of the one-way sprags $156_1$, $156_2$ . . . $158_3$ includes a curved slot 180 for the passage of a continuous coiled bias spring shown in FIG. 10A by reference numeral 182.

The manner in which the one-way sprags operate is significant in that the tails 176 are located on the inboard side of the sprag body portions 162 and protrude through the walls of the output assembly portion 150. Accordingly, the tripper nut 50 can move up or down inside of the member 150 and actuate all of the one-way locking sprags of both sets of sprags $156_1$, $156_2$, $156_3$ and $158_1$, $158_2$, $158_3$. In the process of unlocking under load, for example, against a clockwise torque, the tripper 50 will find the clockwise sprags $158_1$, $158_2$, $158_3$ more resistant than the counter-clockwise sprags $156_1$, $156_2$, $156_3$ so that in the process of unlocking each sprag will initially pivot about an output contact point and release from the inboard contact point. It will then pass through the respective pin 160 and the upper member 150 of the output drive member 46", after which each sprag will pivot about the center of its pin and a clearance will be created between the respective sprags and the casing 48" on the outboard side of the device. Following release, as the input drive member 44" continues to be driven clockwise, the pins 60 are trapped in the output drive assembly and they rotate with the output drive member 46", taking the sprags with them.

Figure 10A:
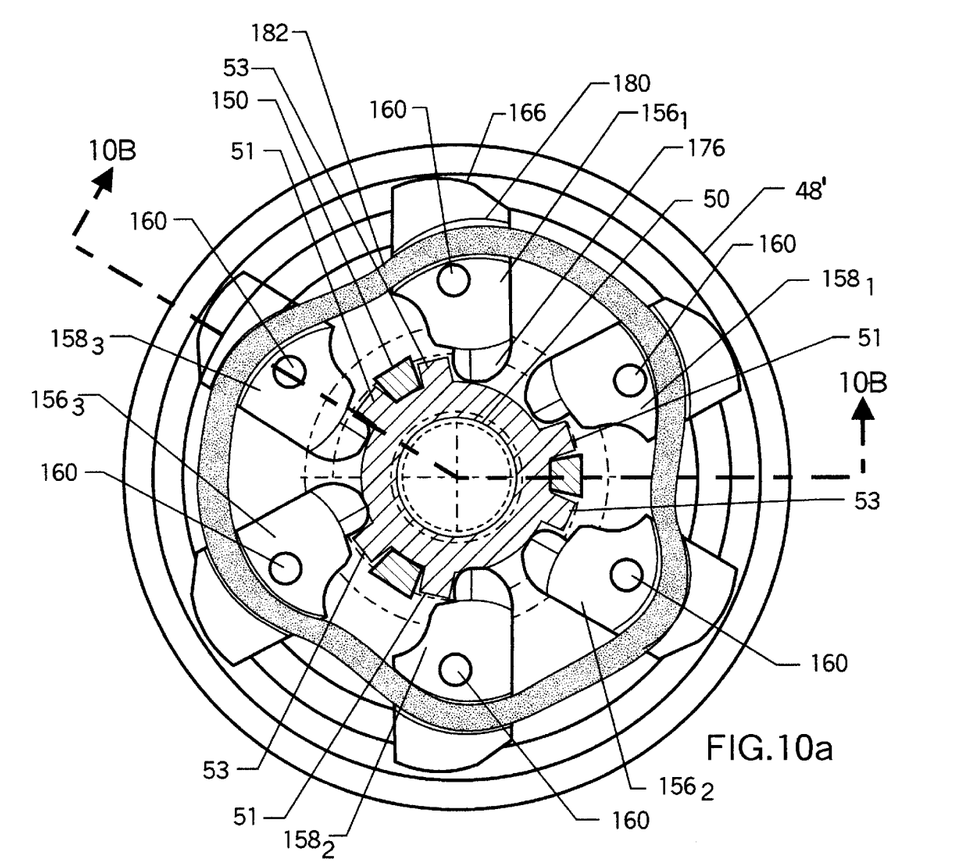
FIG. 10A is a top plan view of a third embodiment of the subject invention.
Figure 10B:
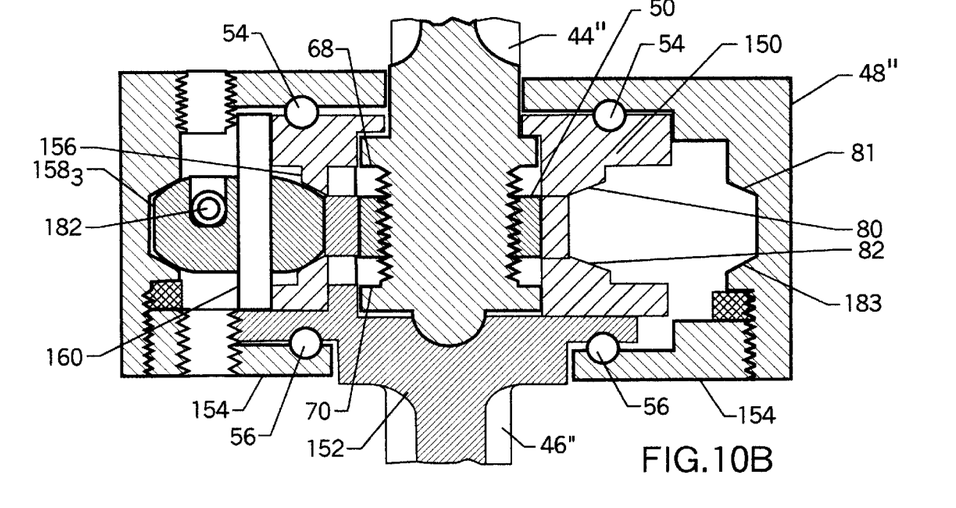
FIG. 10B is a sectional view of the third embodiment shown in FIG. 10A taken along the lines 10B—10B thereof.
Figure 11:
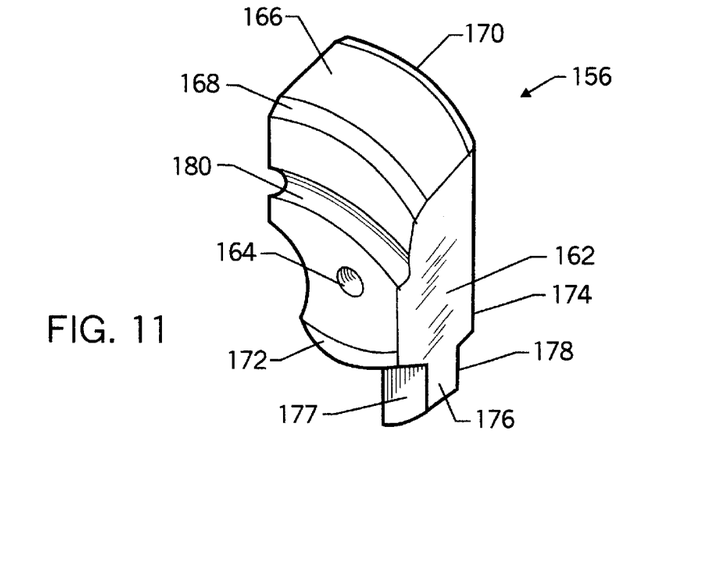
FIG. 11 is a perspective view of a second 3-D sprag member utilized in the third embodiment shown in FIGS. 10A and 10B.

Relocking is the same as for the two-way locking sprag except that a single preload coiled spring 182, as best shown in FIG. 10A, is sufficient to preload all of the sprags $156_1$, $156_2$, $156_3$ and $158_1$, $158_2$ and $158_3$ into locking engagement with the outer casing 48".

Figure 12A:
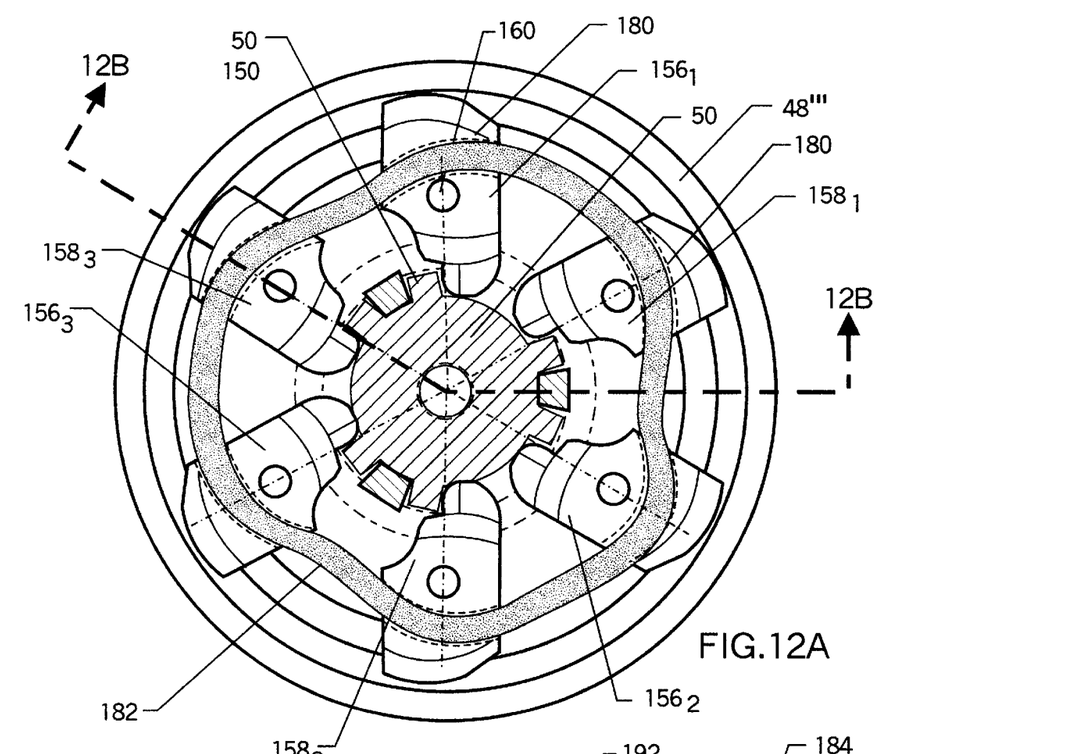
FIG. 12A is a top plan view of a fourth embodiment of the invention.
Figure 12B:
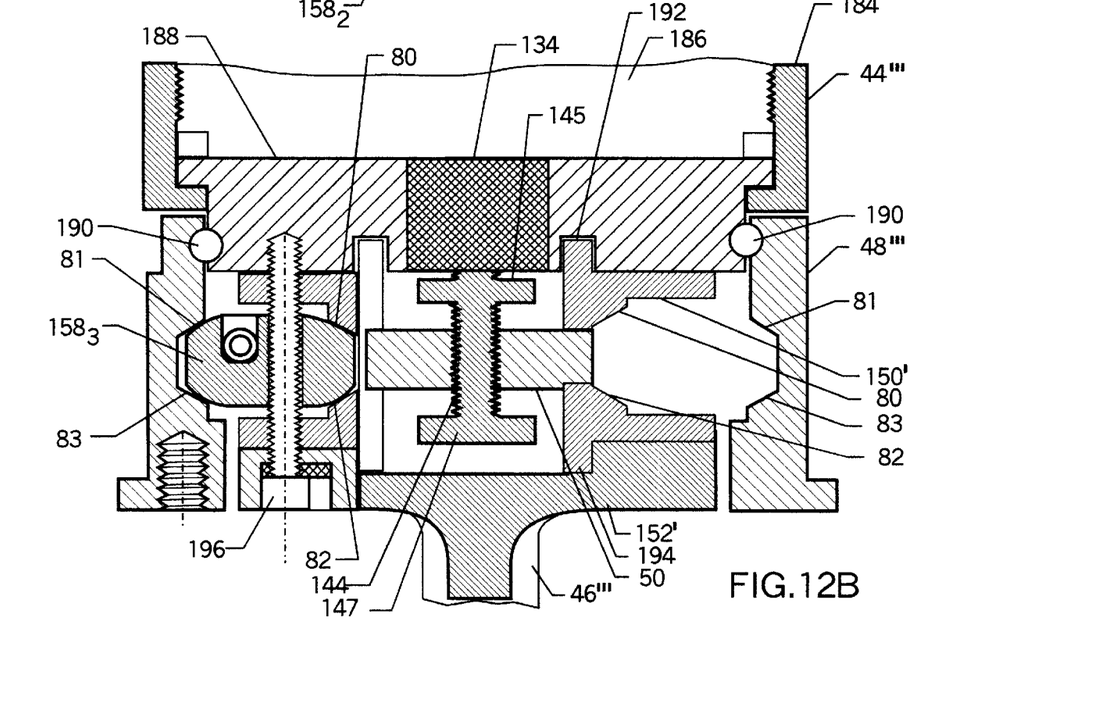
FIG. 12B is a sectional view of the fourth embodiment taken along the lines 12B—12B thereof.
Figure 13A:
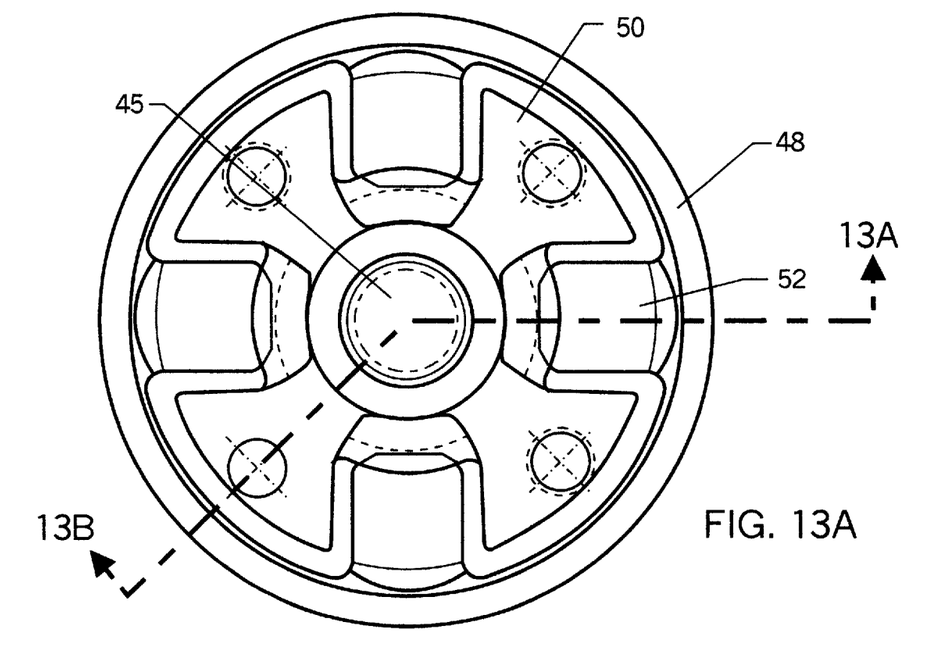
FIG. 13A is a top plan view of a fifth embodiment of the invention.
Figure 13B:
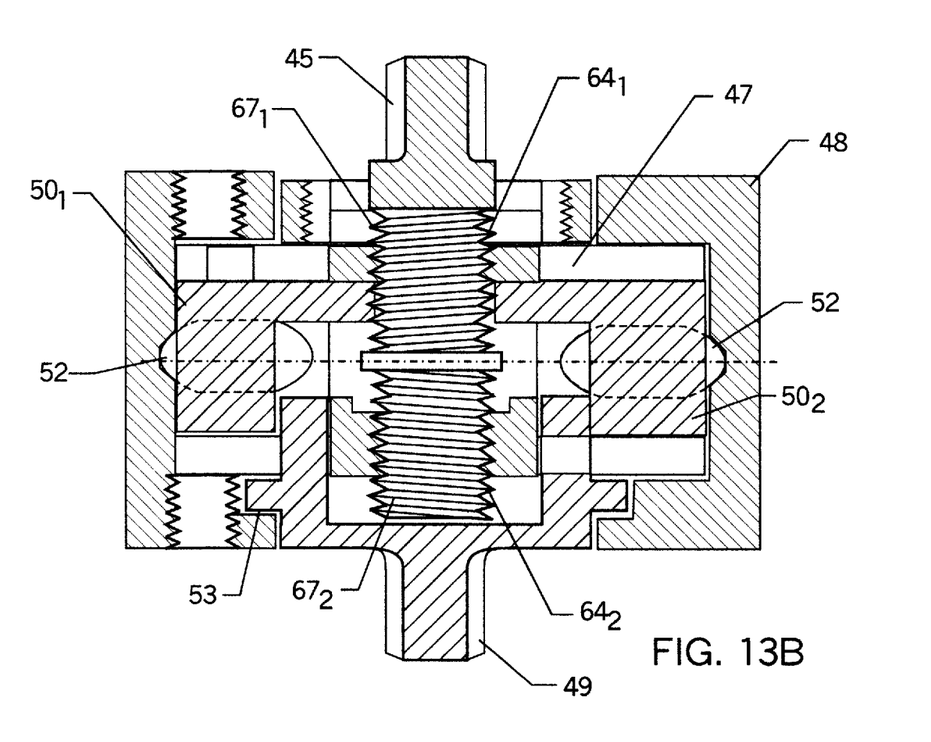
FIG. 13B is a sectional view of the fifth embodiment shown in FIG. 13A taken along the lines 13B—13B thereof.

A motor-actuated version of the embodiment shown in FIGS. 10A and 10B comprises a fourth embodiment of the invention and is depicted in FIGS. 12A and 12B. Referring now to these figures, the primary difference between this and the self-actuated brake assembly of the third embodiment is in the input drive assembly as best shown in FIG. 12B by reference numeral 44'" inasmuch as the one-way sprag configuration shown in FIG. 12A is virtually the same as shown in FIG. 10A. With respect to the structure of the input drive assembly 44'", it includes a drive member 184 which includes a cavity 186 for a torque motor or a wrist joint, not shown, similar to the motor driven embodiment shown in FIG. 9B. The member 184 is coupled to a motor support base plate 188 which is journaled by a set of ball bearings 190 against an outer casing 48'". The base plate 188 is adapted to accommodate and support an unlocking/locking motor 134' which includes a threaded output shaft 144' having upper and lower end stop elements 145 and 147 integrated therewith. Again, both the base plate 188 and motor 134' can comprise a single component. The upper and lower portion of the member 150' additionally includes upper and lower torque transfer tabs 192 and 194 which respectively extend up into the motor base plate 188 and the lower output drive member 152'. Also, the pivot pins 160 utilized in the self-actuated configuration as shown in FIGS. 10A and 10B are now replaced by assembly bolt members 196.

The motor actuated embodiment of FIGS. 12A and 12B operates in the same manner as described with respect to the self-actuated embodiment of FIGS. 10A and 10B and therefore does not need to be repeated.

Figure 14:
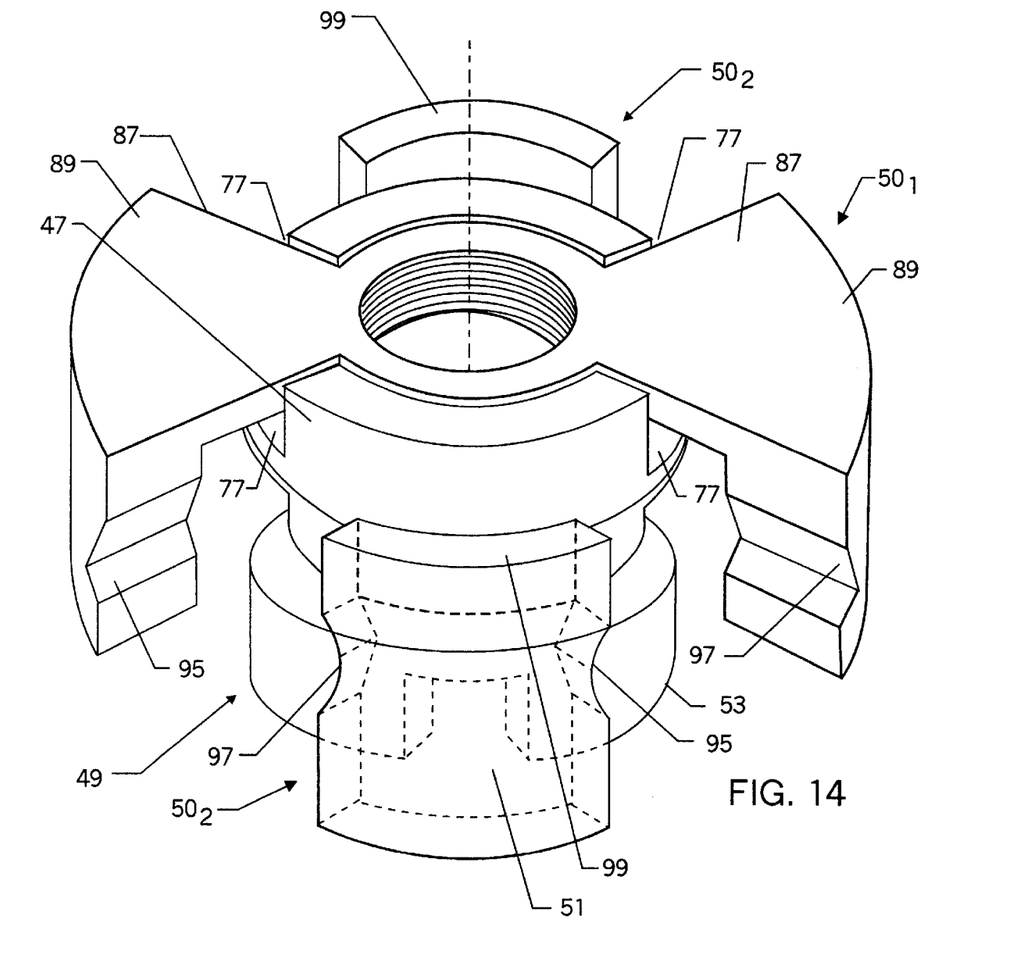
FIG. 14 is a perspective view of the tripper assembly shown in FIG. 13B.

While the embodiments of the invention shown and described thus far have involved a single tripper nut member 50 such as shown in FIG. 5, FIGS. 13A, 13B and 14 disclose a fifth embodiment of the invention where a pair of upper and lower tripper nut members $50_1$ and $50_2$ are utilized in combination with a common input drive element, namely an input drive member 45 having upper and lower threaded shank portions $64_1$ and $64_2$. The threads $67_1$ and $67_2$ on the shank portions $64_1$ and $64_2$ are reversed so that the upper and lower tripper nut members $50_1$ and $50_2$ translate either upwardly or downwardly in mutually opposite directions while being restrained from rotation by a pair of spline slots 77 in the upper section 47 of an output drive member 49 as shown in FIG. 14. The bottom tripper nut member $50_2$ is splined by a pair of spline slots, one of which is shown in phantom by reference numeral 51 in the lower section 53 of the output drive member 49 also shown in FIG. 14.

In FIG. 14, the upper tripper nut member 50 is shown having two outwardly extending arm sections 87 having curved outer portions 89 which respectively include pairs of tripper faces 95 and 97, while the lower tripper nut member 50₂ is comprised of two opposing sections 99 also having tripper faces 95 and 97 on front and rear surfaces thereof. The tripper faces 95 and 97 shown in FIG. 14 are operated in connection with two-way split sprags 52 as shown in FIG. 7; however, when desirable, they can be reconfigured for use with one-way sprags 156 and 158 such as shown in FIG. 11.

Thus the tripping members 50₁ and 50₂ move either toward each other or away from each other, depending upon the direction of rotation of the input drive member 45.

The fifth embodiment can be operated either as a self driven device or a motor driven device. However, it has a disadvantage in comparison to the foregoing embodiments in that it is relatively longer in axial length and more expensive and more complex to fabricate. It does, however, have an advantage over a single tripper system when two-way sprags are used in that in the process of unlocking, the upper surface of the upper tripping nut will encounter one side of the sprag, and a lower tripping surface of the lower nut will encounter the other side of the same sprag. Thus, the sprag will experience one force vector pushing it inward to unlock and another pushing it down, whereas on the other side, the same sprag will experience a force vector pushing it inwards to unlock, and another pushing it upwards. Since the respective forces on the sprags are essentially equal and opposite to each other, the sprags experience an essentially pure shearing motion between its two halves to unlock with no net motion up or down. The single tripper system does experience a net force up or down depending upon which way the tripper is being driven; however, this should be of very little consequence because the sprags utilized are 3-D sprags trapped in a set of grooves so that once the sprag is unlocked, the forces on the sprag drop to essentially zero and it matters little if the sprag is contacting a groove on one side or the other.

Having thus shown and described what is at present considered to be the preferred embodiments of the invention, it should be noted that the same is made by way of illustration and not limitation. Accordingly, all alterations, modifications and changes coming within the spirit and scope of the invention are herein meant to be included.

I claim:

1. A roller brake assembly, comprising:

rotatable input drive means including a driven screw member located along a central rotational axis;

rotatable output drive means coaxially located along said central rotational axis adjacent said screw member and including an inner portion having at least one spline surface region and an outwardly facing sprag contact surface region;

outer casing means having an interior inwardly facing sprag contact surface region opposite said outwardly facing sprag contact surface region of said output drive means;

sprag means located between said inner portion of said output drive means and said casing and being in contact with said outwardly and inwardly facing sprag contact surface regions and being spring biased so as to lock said output drive means to said casing in absence of said input drive means being rotated; and tripper nut means located on said screw member and being restrained from rotation by said spline surface region while being translated up or down said screw member between stops at opposite ends of said screw member when said screw member is driven in a clockwise or counterclockwise direction, said tripper nut means further including means for unlocking said sprag means from said casing upon translating to said stops and locking said input drive means to said output drive means when said input means is rotated.

2. A roller brake assembly according to claim 1 wherein said sprag means comprises a plurality of sprag members located between said outwardly and inwardly facing sprag contact surface regions.

3. A roller brake assembly according to claim 2 wherein both said outwardly and inwardly facing sprag contact surface regions include pairs of mutually opposing symmetrical contact surfaces.

4. A roller brake assembly according to claim 3 wherein said sprag members include pairs of mutually opposing symmetrical contact surfaces complementary with said pairs of symmetrical sprag contact surfaces of said outwardly and inwardly facing sprag contact surface regions.

5. A roller brake assembly according to claim 4 wherein said pairs of sprag contact surface regions are located in recessed regions in said inner portion of output drive means and said outer casing means.

6. A roller brake assembly according to claim 5 wherein said sprag members include outer end portions which fit into said recessed regions, said outer end portions including said pairs of mutually opposing symmetrical contact surfaces.

7. A roller brake assembly according to claim 6 wherein said recessed regions comprise circumferential grooves having mutually inclined side walls.

8. A roller brake assembly according to claim 7 wherein said outer end portions of said sprag members include curvilinear surfaces.

9. A roller brake assembly according to claim 8 wherein said curvillinear surfaces comprise convex surfaces.

10. A roller brake assembly according to claim 9 wherein said outwardly diverging side walls of said annular grooves include flat side wall surfaces in contact with the convex surfaces of said sprag members.

11. A roller brake assembly according to claim 8 wherein said sprag members are comprised of split sprag members including complementary half sections.

12. A roller brake assembly according to claim 11 wherein each half section of said complementary half sections further include a tongue and groove which fit the groove and tongue, respectively, of the other half section so that said half sections are adapted to slide relative to one another.

13. A roller brake assembly according to claim 12 and additionally including preload spring means for biasing said half sections apart against said grooves of said outwardly and inwardly facing contact surface regions.

14. A roller brake assembly according to claim 1 and wherein said tripper nut means comprises a threaded inner ring portion having at least one arm portion extending outwardly therefrom terminating in an outer rim portion having at least one contact face for engaging and unlocking one of said sprag members.

15. A roller brake assembly according to claim 14 wherein said tripper nut means includes a plurality of said arm portions, said arm portions having pairs of contact faces for engaging and unlocking respective ones of said sprag members.

16. A roller brake according to claim 14 wherein said driven screw member includes a set of clockwise threads and a set of counterclockwise threads and wherein said tripper nut means includes first and second trip nut members respectively engaging said sets of clockwise and counterclockwise threads so as to translate in mutually opposite directions on said screw member.

17. A roller brake assembly according to claim 8 wherein said sprag members are comprised of spring biased unitary bodies pivoted on respective axes, said axes being parallel to said central rotational axis on said input and output drive means.

18. A roller brake assembly according to claim 17 wherein said sprag members include sets of clockwise and counter-clockwise unlocking sprag members.

19. A roller brake assembly according to claim 18 wherein each of said sprag members include an appendage extending therefrom for being actuated by said tripper nut means, said tripper nut means rotating said sprag members about said respective axes and thereby initiating an unlocking operation.

20. A roller brake assembly according to claim 19 and additionally including preload spring means contacting said sprag members for biasing said sprag members against said outer casing means and said inner portion of said output drive means.

21. A roller brake assembly according to claim 1 wherein said input drive mean comprises motor driven input drive means driving said driven screw member.

* * * * *